A. SNOOK.
Combined Wind-Wheel and Water-Power.
No. 196,128. Patented Oct. 16, 1877.
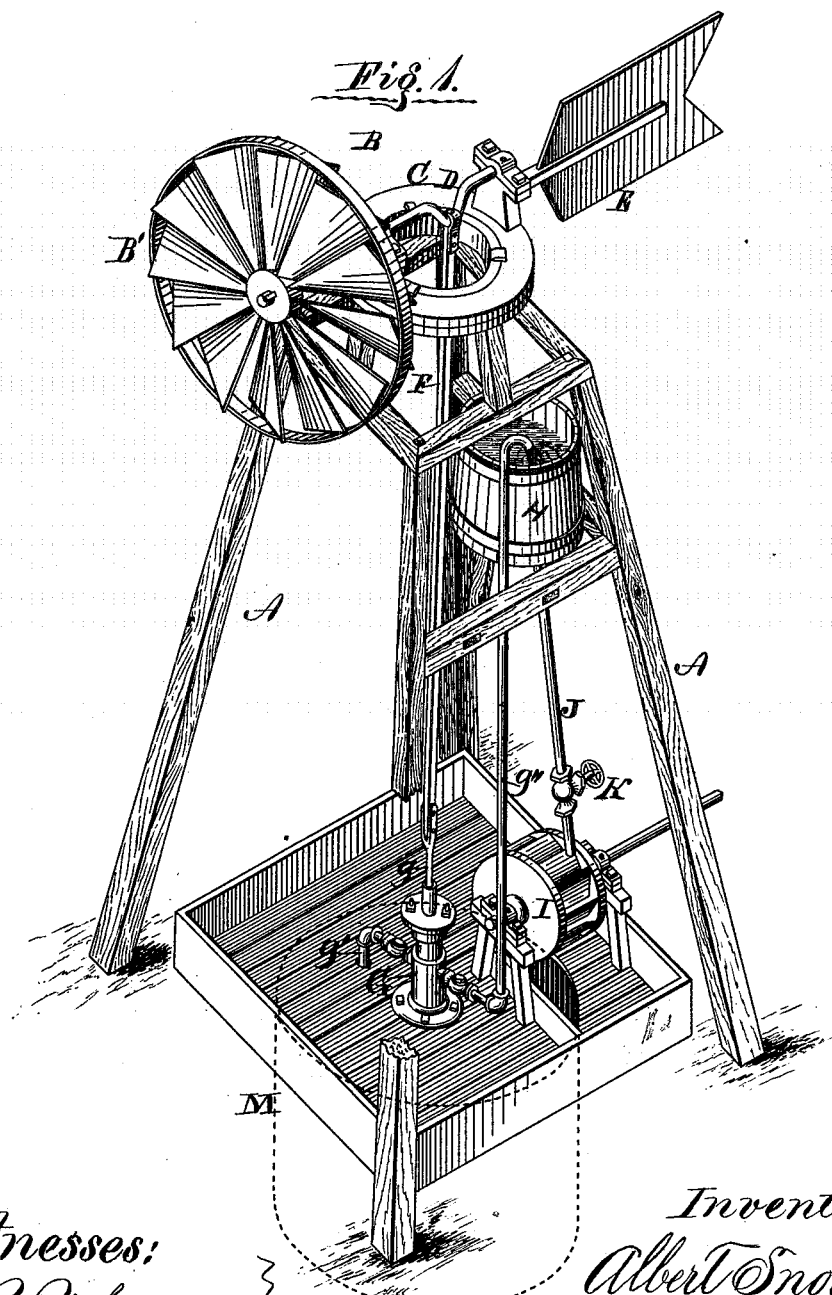

UNITED STATES PATENT OFFICE.

ALBERT SNOOK, OF OSWEGO, ILLINOIS.

IMPROVEMENT IN COMBINED WIND-WHEEL AND WATER-POWER.

Specification forming part of Letters Patent No. 196,128, dated October 16, 1877; application filed April 7, 1877.

*To all whom it may concern:*

Be it known that I, ALBERT SNOOK, of Oswego, in the county of Kendall and State of Illinois, have invented certain new and useful Improvements in Combined Windmill and Water-Power; and I do hereby declare that the following is a full, clear, and exact description thereof, which will enable others skilled in the art to which it appertains to make and use the same, reference being had to the accompanying drawings, and to letters of reference marked thereon, which form a part of this specification.

The nature of my invention relates to a combined windmill and water-power; and the invention consists in the combination of a windmill with a pump and water-wheel, in such manner that the windmill may be utilized to elevate water, and store it in any suitable reservoir, for use as desired, to propel the water-wheel.

The invention further consists in the construction and combination of certain parts, as set forth and described in the claims hereto annexed.

In the accompanying drawing, Figure 1 is a perspective view of a device embodying the main features of my invention.

Referring to the parts by letters, letter A represents a tower (partly broken away to show other parts) supporting the working parts. B' represents the wheel, C the turn-table, D the shaft, E the vane, and F the connecting-rod, of a windmill, B, the connecting-rod F extending to and connecting with the piston $g$ of a pump, G, having a suction-pipe, $g'$, and discharge-pipe $g''$.

The parts hereinbefore described I do not claim separately nor describe in detail, as the windmill and pump may be of any ordinary kind; and the tower A may be framed in any manner desired, or may be represented by a building of any kind, in which the device may be erected, or by any means of supporting the parts in an elevated position.

Letter H represents a reservoir, supported by the tower A, or otherwise, at any desired elevation, and receives water from the pipe $g''$. I is a water-wheel, mounted in suitable bearings, and may be of any desired style or class, and is mounted so as to receive water discharged from the pipe J, which leads from the tank H, and is provided with a stop-cock, K, or any suitable water-gate. L is a tank, which receives the water discharged from the wheel I, and returns it to the supply cistern, well, or tank, (shown in the drawings by the dotted lines M,) and from which the water is drawn by the pipe $g$.

The operation is as follows: The water is drawn from the cistern M by the pump G, and discharged into the reservoir H by the pipe $g''$ by means of the windmill B, where it may be held, and discharged as desired, and when desired, by means of the stop-cock K; and in this manner the uncertain force of the windmill may be utilized to store up a force which may be distributed slowly or rapidly, as desired, and with perfect regularity.

Having thus described my invention, what I claim as new, and desire to secure by Letters Patent, is—

The combination of the windmill B, pump G, having pipes $g'$ $g''$, tank H, pipe J, having stop-cock K, water-wheel I, and tanks H M, substantially as described, and for the purpose specified.

In testimony that I claim the foregoing as my own I affix my signature in presence of two witnesses.

ALBERT SNOOK.

Witnesses:
 THOMAS MCKEE,
 P. R. RICHARDS.